United States Patent [19]

Lurie

[11] 4,142,772
[45] Mar. 6, 1979

[54] REDUNDANT HOLOGRAM RECORDING METHOD EMPLOYING TEMPORAL INFORMATION SIGNAL

[75] Inventor: Michael J. Lurie, East Brunswick, N.J.

[73] Assignee: RCA Corporation, New York, N.Y.

[21] Appl. No.: 796,416

[22] Filed: May 12, 1977

[51] Int. Cl.² .................. G03H 1/08; G03H 1/16
[52] U.S. Cl. .................... 350/3.66; 350/3.82
[58] Field of Search ............. 350/3.5, 3.66, 3.82; 358/90, 230, 130

[56] References Cited

U.S. PATENT DOCUMENTS

| | | | |
|---|---|---|---|
| 3,516,721 | 6/1970 | Collier et al. | 350/3.5 |
| 3,591,252 | 7/1971 | Lu | 350/3.5 |
| 3,604,778 | 9/1971 | Burckhardt | 350/3.5 |
| 3,674,332 | 7/1972 | Kogelnik | 350/3.5 |
| 3,698,787 | 10/1972 | Mueller et al. | 350/3.5 |
| 3,786,180 | 1/1974 | Macouski | 358/90 |
| 3,838,904 | 10/1974 | Takeda et al. | 350/3.5 |

Primary Examiner—Ronald J. Stern
Attorney, Agent, or Firm—H. Christoffersen; Samuel Cohen; George J. Seligsohn

[57] ABSTRACT

A redundant Fraunhofer or Fresnel hologram is recorded by interfering a temporal-information beam with a reference beam of mutually coherent light. The temporal-information beam is intensity-modulated with each of a series of samples of the temporal information signal. The relative phase difference between the two interfering beams is selectively determined for each sample of the series and the effective value of the angular displacement between the two interfering beams is changed for each successive sample of the series. The hologram can be recorded directly from an electronic signal, such as television, without the need for a coherently illuminated object, or an intermediate imaging step, such as transcribing from television to film.

1 Claim, 4 Drawing Figures

REDUNDANT HOLOGRAM RECORDING METHOD EMPLOYING TEMPORAL INFORMATION SIGNAL

This invention relates to the recording of redundant holograms and, more particularly, to a method employing a temporal information signal for recording a redundant hologram directly, without the need for a coherently illuminated object.

Methods for recording and reconstructing redundant holograms are known in the art. However, in the past, a spatial, rather than a temporal, information signal has been utilized. This spatial signal may comprise a three-dimensional object which diffusely reflects an illuminating beam of coherent wave energy to form a spatial information beam of coherent wave energy. Alternatively, the spatial signal may comprise a transparency or a specularly-reflecting object which may be simultaneously illuminated with a plurality of object beams of coherent wave energy to derive a spatial information beam of coherent wave energy. The redundant hologram is then recorded by simultaneously illuminating a given area of a hologram recording medium with both the plurality of spatial information beams and a mutually coherent reference beam of this wave energy which is angularly displaced with respect to the spatial information beam. The hologram comprises the interference pattern between the spatial information and reference beams, which is recorded on the given area on the hologram recording medium.

In the case where the spatial information beam is derived from a transparency or a specularly-reflecting object, the redundant hologram comprises the superposition on the given area of the hologram recording medium of a plurality of separate sub-holograms. Each sub-hologram results from the interference between the reference beam and the spatial information beam component derived from each separate one of the aforesaid plurality of object beams. In addition to these desired sub-holograms, the use of a plurality of object beams inherently results in the recording of undesired coherent-noise patterns. These coherent noise patterns result from the interference among themselves of the various spatial information beam components derived, respectively, from the plurality of object beams. When the plurality of object beams has been conventionally produced by means of a light diffuser, readout of the recorded redundant hologram reconstructs an image which includes unwanted speckle noise. The amount of such speckle noise is greater for small-area recorded redundant holograms than it is for large-area recorded redundant holograms.

Reference is made to each of U.S. Pat. Nos. 3,650,595, 3,689,129, and 3,756,684, all of which are assigned to the assignee of the present invention. These patents disclose arrangements for deriving a plurality of object beams for use in recording redundant holograms in such a manner that the reconstructed hologram image contains substantially no resolvable speckle or other coherent noise. This is achieved by confining the spatial frequency of any coherent noise pattern which may be produced to a value that is higher than the resolution capability of the reconstructed hologram image. At the same time, high resolution of the desired reconstructed hologram image information is maintained.

More specifically, the aforesaid U.S. Pat. Nos. 3,689,129 and 3,756,684 teach how a relatively coarse pinhole array may be employed to spatialy sample with high resolution a transparency or specularly-reflecting object in the recording of a highly redundant hologram which, on readout, reconstructs a high resolution image in which (assuming no optical defects are present in the recording system) resolvable coherent noise is eliminated. In addition, the aforesaid U.S. Pat. No. 3,756,684 teaches specific spatial patterns for the coarse pinhole array which have the effect of minimizing the resolvable coherent noise patterns present in the reconstructed hologram image even when optical defects are present in the hologram recording system.

The present invention is directed to a method for employing a temporal information signal (rather than a spatial information signal) for recording a redundant hologram on a given area of a recording medium that is simultaneously illuminated by angularly displaced information and reference beams of mutually coherent wave energy. In accordance with the method of the present invention, the information beam is intensity-modulated with each of a series of samples of the temporal information signal, with each sample occurring during a separate one of successive sampling periods. In addition, a determined one of a group of preselected relative phase differences between the information and reference beams is provided during each separate one of the sampling periods, with the determined one of the group for any sampling period being determined in accordance with the ordinal position in the series of the sample occurring during that sampling period. Further, the effective value of the angular displacement between the information and reference beams is changed for each successive sample in the series. The temporal-information-signal method of the present invention is capable of recording a redundant hologram which is effectively equivalent to and exhibits the aforesaid desirable features of the spatial-information-signal recorded redundant hologram disclosed in the aforesaid U.S. Pat. No. 3,756,684.

Certain conventional optical elements often employed in recording holograms, such as beam expanders, collimators, mirrors, etc., which are not germane to an understanding of the present invention, have been omitted from the drawings, although in practice they may be used.

Figure 1:
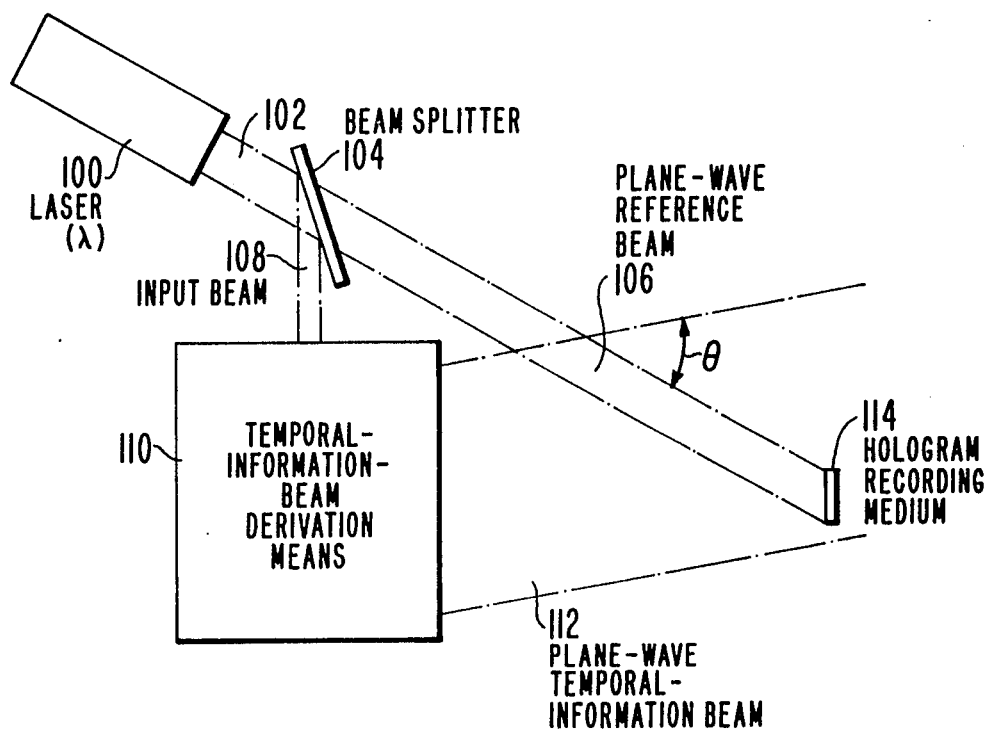
FIG. 1 is a schematic diagram of an embodiment of the present invention for recording a redundant Fraunhofer hologram in accordance with a temporal-information-signal.
Figure 2:
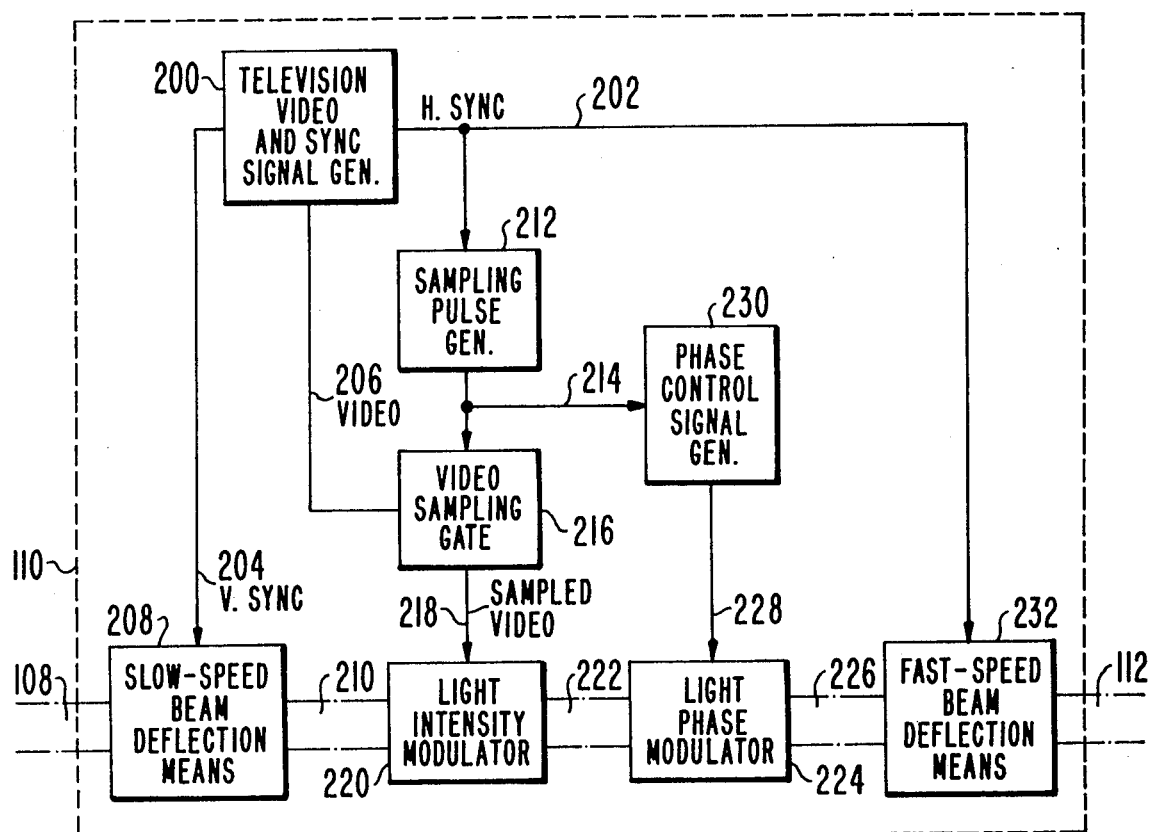
FIG. 2 illustrates one embodiment of the temporal-information-beam derivation means of FIG. 1.

Referring to FIG. 1, laser 100 generates output beam 102 of coherent plane-wave light energy at a wavelength $\lambda$. Beam splitter 104 divides beam 102 into plane-wave reference beam 106 and input beam 108. Input beam 108 is operated on by temporal-information-beam derivation means 110 (an embodiment of which is shown in FIG. 2) to derive plane-wave temporal-information beam 112 (the characteristics of which are discussed below in detail). The given area of hologram recording medium 14 is simultaneously illuminated by plane-wave reference beam 106 and plane-wave temporal information beam 112. As indicated in FIG. 1, plane-wave reference beam 106 and plane-wave temporal information beam 112 are angularly displaced by an angle $\theta$ with respect to each other.

It is known in the art that the interference pattern produced by angularly-displaced plane-wave beams of mutually coherent wave energy of a given wavelength constitutes the Fraunhofer hologram of a single point. In particular, when such a Fraunhofer hologram of a single point is illuminated with a readout beam of plane-wave coherent wave energy corresponding to reference beam 106, and an imaging lens is placed in the path of one of the first diffraction-order output beams of the hologram being read out, the first diffraction-order beam focuses to a certain image point in the focal plane of the imaging lens. The spatial position of this certain image point, with respect to the focal point of the imaging lens, is determined by the angle $\theta$ between the plane-wave reference and information beams 106 and 112 which was employed in the recording of the redundant hologram. Further, the relative intensity of this certain image point is determined by the relative intensity of the plane-wave information beam 112 at the time the Fraunhofer hologram of this single point was recorded.

Thus, a hologram of a two-dimensional scene may be sequentially recorded, point by point, by scanning plane-wave temporal information beam 112 so that the value of angle $\theta$ corresponds, in turn, to each separate sample point of the scene. At the same time, the relative intensity of plane-wave temporal information beam 112 in recording each separate sample point. As in the recording of a redundant hologram with a spatial-information beam, such as described in the aforesaid U.S. Pat. Nos. 3,689,129 and 3,756,684, a problem which also exists in the recording of a redundant hologram with a plane-wave temporal information beam is to simultaneously provide both high resolution sampling of the scene (i.e. a high sampling frequency) and high effective redundancy. In the case of the spatial-information beam disclosed in the aforesaid U.S. Pat. Nos. 3,689,129 and 3,756,684, this is accomplished by employing a relatively coarse pinhole array and situating a sampled transparency of a given scene an appropriate distance away from the pinhole array. In the case of a plane-wave temporal-information beam, using a high sampling rate for high resolution, and selectively providing a determined one of a group of predetermined relative phase differences between the information and reference beams for each separate sample results in an effect corresponding to that obtained by the pinhole array arrangement in the spatial-information hologram recording systems disclosed in U.S. Pat. Nos. 3,689,129 and 3,756,684.

Referring now to FIG. 2, there is shown an embodiment of temporal-information beam derivation means 110 for providing a plane-wave temporal-information beam 112 in which (1) the information beam is intensity-modulated with each of a series of samples of a temporal information signal; (2) plane-wave temporal information beam 112 has a different determined one of a group of predetermined relative phase differences with respect to plane-wave reference beam 106 during each separate one of the sampling periods during which the aforesaid samples occur, and (3) the effective value of the angular displacement between plane-wave temporal-information beam 112 with respect to plane-wave reference beam 106 is changed for each successive sample in the series.

FIG. 2 shows an embodiment of block 110 for the case where the temporal signal is derived from a television signal. Specifically, as shown in FIG. 2, block 110 includes television video and sync signal generator 200 for deriving a horizontal (H) sync signal on conductor 202, a vertical (V) sync signal on conductor 204 and video signal on conductor 206. Television, video and sync signal generator 200 may be any known type of apparatus for producing such signals, such as a television camera, a video tape recorder, a video disc, etc. Slow-speed beam deflection means 208, by linearly deflecting input beam 108 in the vertical direction at a television field frequency (e.g. 60 hertz) determined by that of the V sync signal on conductor 204, produces vertically deflected beam 210. Slow-speed deflections means 208 may comprise plane-wave mirror means rotating at an angular velocity determined by the applied V sync control signal.

Figure 3:
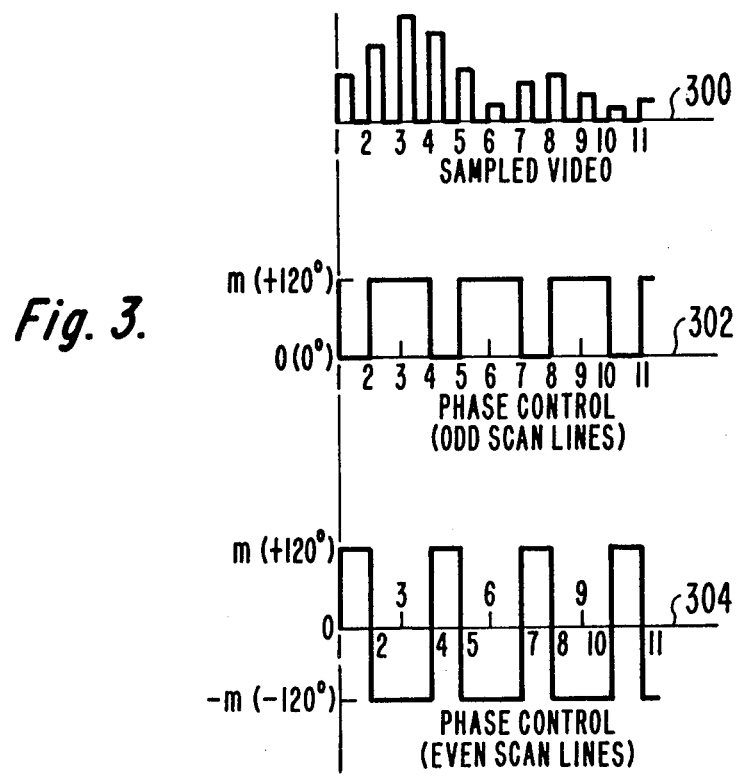
FIG. 3 is a timing diagram of certain temporal-signals utilized in the embodiment of FIG. 2.

Sampling pulse generator 212 may include a clock which produces a series of sampling pulses on conductor 214 at a repetition frequency which is greater then twice the highest video-signal frequency which is to be resolved in the reconstruction of the recorded redundant hologram (i.e. at a sampling pulse repetition rate which satisfies Nyquist's theorem). At the beginning of each horizontal scan-line, the sampling pulse repetition rate is synchronized with the H sync signal applied as a control signal to generator 212. Video sampling gate 216 samples the video signal on conductor 206 in accordance with the sampling pulses applied as a control signal thereto over conductor 214. The output from video sampling gate 216, appearing on conductor 218, constitutes the sampled video signal. Graph 300 of FIG. 3 shows a representative series of 10 samples occurring during 10 successive sampling periods.

Light intensity modulator 220 may comprise an electro-optic crystal inserted between an input polarizer and an output polarization analyzer. Modulator 220 intensity modulates the light which is passed through it, in accordance with the sampled video signal on conductor 218. Therefore, light beam 222, emerging from light intensity modulator 220, comprises a vertically-deflected beam which is also intensity-modulated in accordance with the sampled video signal on conductor 218. Light-beam 222 is then passed through light phase modulator 224 to provide, at the output of light phase modulator 224, a vertically-deflected light beam 226 which is both intensity-modulated and phase modulated. Light phase modulator 224 may comprise an electro-optic crystal which introduces a variable phase delay between the input and output thereof in accordance with the level of the control signal on conductor 228 applied as an input thereto.

The series of sampling pulses on conductor 214 is applied as an input to phase control signal generator 230, which produces a selected one of a group of different predetermined signal levels on conductor 228 during each individual one of the sampling periods. In this manner, the relative phase of beam 226 during each separate sampling period is determined.

In accordance with a preferred arrangement of the present invention, the signal level on conductor 228 is selected from a group of three different predetermined signal levels. The first of these three signal levels has a value of zero which, when selected, produces a zero degree relative phase for beam 226. The second of these three predetermined levels has a value m which, when selected, produces a relative phase of +120° for beam 226. The third of these predetermined levels has a value −m which, when selected, produces a −120° relative phase for beam 226.

In this preferred arrangement, phase control signal generator 230 selects the value of signal level applied to conductor 228 in accordance with the ordinal position of the sample within a scan line and also in accordance with whether the scan line is an odd scan line or an even scan line. More specifically, as shown in graph 302 in FIG. 3, during one set of alternate scan lines (odd), the first of each group of the three consecutive sampling periods has a zero-valued signal level applied to conductor 228 from phase control signal generator 230, while the second and third sampling periods of each consecutive group of three sampling periods has an m value of signal level (corresponding to +120°) applied to conductor 228 from phase control signal generator 230. As shown in graph 304 of FIG. 3, during another set of alternate scan lines (even), the first of each group of three consecutive sampling periods has an m value of signal level (corresponding to +120°) applied to conductor 228 from phase control signal generator 230 and the second and third of each group of three consecutive sampling periods has a −m value of signal level (corresponding to −120°) applied to conductor 228 of phase control signal generator 230. Employing the preferred embodiment of phase control signals shown in graphs 302 and 305 of FIG. 3, a preferred redundant hologram of the type disclosed in the U.S. Pat. No. 3,756,684 is recorded. In this case, coherent noise patterns due to optical defects in the reconstructed image of the redundant hologram are minimized. However, it should be understood, that the present invention contemplates other formats of relative phase differences from those shown in graphs 302 and 305 of FIG. 3 in the recording of redundant holograms with a temporal information signal.

Fast speed beam deflection means 232, which is synchronized with the H sync signal on conductor 202, horizontally deflects light beam 226 applied thereto. Since beam 226 is already vertically deflected, intensity modulated and phase modulated, temporal information beam 112 emerging from fast-speed beam deflection means 232, is, in addition, horizontally deflected at the television scan-line frequency (e.g., 15,750 hertz). To achieve this high rate, fast-speed beam deflection means 232 may comprise acousto-optic beam deflection means, which are in the art.

Ideally, fast-speed beam deflection means 232 should change the value of angle θ (shown in FIG. 1) in discrete steps (i.e., be a "staircase" wave), in which the step rise only in the interval between successive samples, shown in graph 300 of FIG. 3, so that angle θ does not change during the occurrence of each sample. This prevents any "smearing" of the recorded sub-hologram corresponding to each sample. However, there are normally several hundred samples per horizontal scan-line (the exact number depending upon resolution requirements) and the horizontal scan-line frequency is high (normally 15,750 hertz). Therefore, the actual amount of "smearing" produced by a continuous (rather than a "staircase" wave) linear scan is so small as to be normally unresolvable. Any "smearing" due to the use of a continuous vertical deflection at the television field frequency (60 hertz) is completely insignificant. Preferably, the mean value of the signal θ is about 30° and preferably the maximum deflection with respect to the mean value is no greater than ±15°.

The order in which the light goes through deflection means 208 and 232 and modulators 220 and 224 is a matter of choice. Therefore, if desired, slow-speed beam deflection means 208 could be located after modulators 220 and 224, rather than before as shown in FIG. 2.

In the arrangement shown in FIGS. 1 and 2, it is the information beam which is operated on by the phase modulator to change the relative phase of plane-wave temporal information beam 112 with respect to plane-wave reference beam 106. Instead, if desired, plane-wave reference beam 106 could be operated on by a light phase modulator to provide a determined one of a group of different predetermined relative phase differences between the information and reference beams during each separate one of the sampling periods.

Figure 1A:
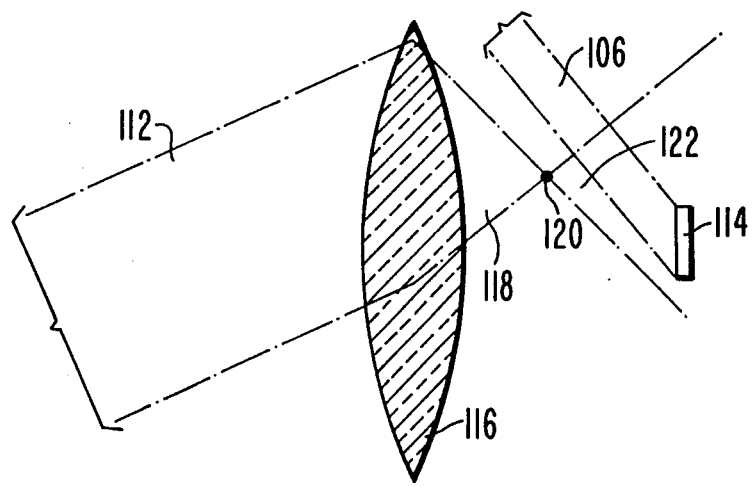
FIG. 1a shows modification of the embodiment of FIG. 1 for recording a redundant Fresnel hologram in accordance with a temporal-information-signal.

As so far described, a redundant Fraunhofer hologram is recorded on a given area of a hologram recording medium 114. However, in accordance with the modification shown in FIG. 1a, a Fresnel redundant hologram can be recorded on a given area of hologram recording medium 114. Specifically, by placing convex lens 116 in front of hologram recording medium 114 in the path of plane-wave temporal information beam 112, plane-wave temporal information beam 112 is converted into converging spherical temporal-information beam 118. Beam 118, after converging to point 120 in the focal plane of lens 116, forms diverging temporal information beam 112. Diverging temporal-information beam 122 and plane-wave reference beam 106 simultaneously illuminate the given area of hologram recording medium 114 to record a redundant Fresnel hologram. In the recording of this redundant Fresnel hologram, the relative position of point 120 in the focal plane of lens 116, with respect to the focal point thereof, varies with the deflection angle of plane-wave temporal information beam 112. Other components, such as lenses, mirrors or prisms, may be placed in the beams to provide other types of holograms.

What is claimed is:

1. In a method for optically recording a surface hologram on a given area of a recording medium that is simultaneously illuminated by angularly-displaced information and reference beams of mutually coherent wave energy, wherein said information beam is intensity-modulated successively by each of a series of samples of a video signal of a scene that has been raster-scanned by a plurality of relatively fast substantially linear scans parallel to a first direction and at least one relatively slow substantially linear scan in a second direction substantially perpendicular to said first direction, and wherein the value of the angular displacement between said information and reference beams is varied for each successive sample in correpondence with said raster scan so that said hologram reconstructs an image of said scene; the improvement for reducing the resolvable coherent noise patterns present in the reconstructed image due to optical defects in the recording of said hologram, said improvement comprising the steps of:

during each line of a first set, comprising alternate ones of said linear scans in said first direction, providing a first given relative phase difference between said information and reference beam for the first sample of each of successive groups of three consecutive samples during that line of said first set, and providing a second given relative phase difference 120° displaced from said first given relative phase difference for the second and third sample of each of said successive groups of three consecutive samples during that line of said first set, and during each line of a second set, comprising the remaining ones of said linear scans in said first direction, providing said second given relative phase difference for only those samples of that line of said first set having said first given relative phase difference, and providing a third given relative phase difference 120° displaced from both said first and second given relative phase difference for the remaining samples of each line of said second set.

* * * * *